Figure 1:
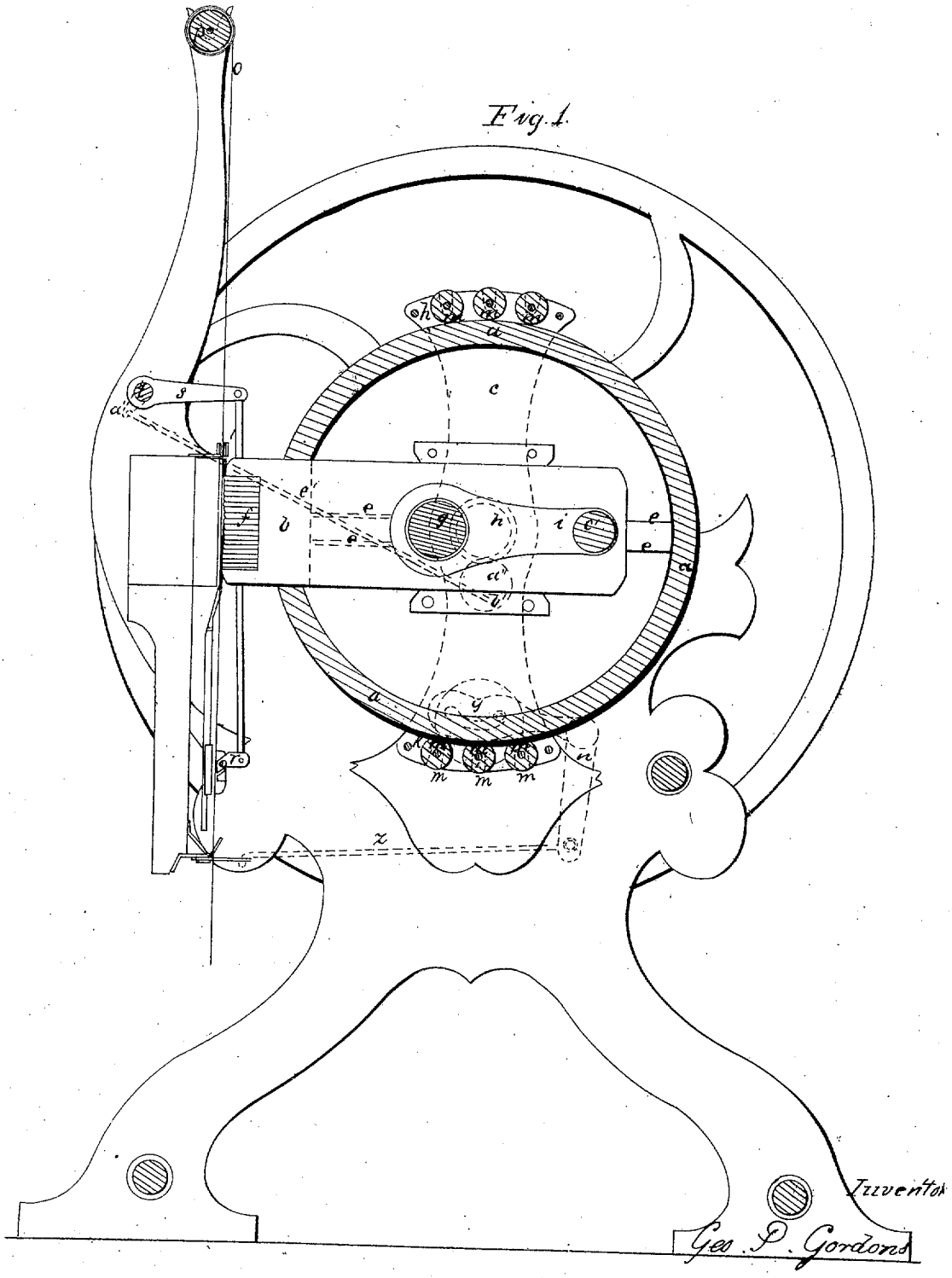
Figure 2:
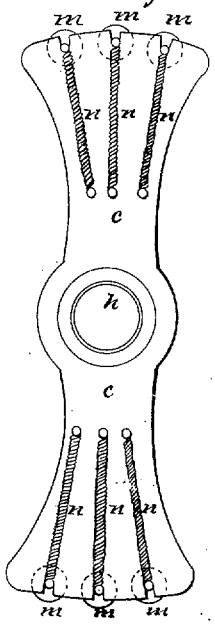
Figure 3:
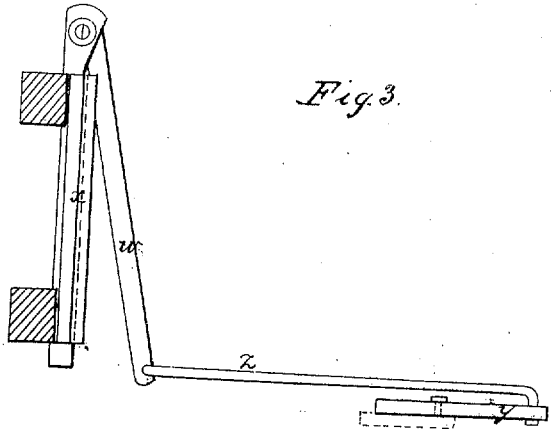
Figure 4:
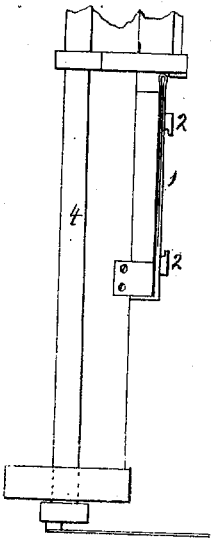
Figure 5:
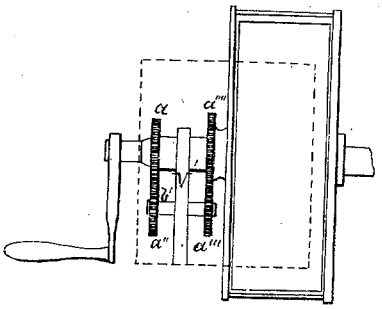
Figure 6:
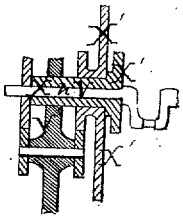

G. P. Gordon. Sheet 1. 2 Sheet.

Printing Press.

No. 529. Reissued Feb. 23. 1858.

Inventor

Geo. P. Gordon

G. P. Gordon. Sheet 2. 2 Sheets.

Printing Press.

Reissued Feb. 23. 1858.

No. 529.

Geo. P. Gordon's

BEST AVAILABLE COPY

UNITED STATES PATENT OFFICE.

GEORGE P. GORDON, OF NEW YORK, N. Y.

IMPROVEMENT IN PRINTING PRESSES.

Specification forming part of Letters Patent No. 9,234 dated August 31, 1852; Reissue No. 529, dated February 23, 1858.

*To all whom it may concern:*

Be it known that I, GEORGE P. GORDON, of New York, in the county and State of New York, have invented certain new and useful Improvements in Printing-Presses, (for letter-press printing;) and I do hereby declare the following to be a full, clear, and exact description of the same, having relation to the construction and operation thereof, reference being had to the annexed drawings, making a part of this specification.

In the drawings the same marks of reference always denote the same parts of the machine in all the figures.

Figure I is a longitudinal section through the center of the machine, the cut parts being shown by the shading, and the parts which do not appear at the center are shown in dotted lines. Fig. II is a section of the side of one of the revolving arms (or the revolving roller-frame) with the springs or rollers in their proper places. Fig. III is a section or plan of the lower part of the machine removed, so as to show the shears, connecting-rod, and edge of the cam. Fig. IV is a section of the sheet-feeding apparatus — that is, the platen as connected with the gage, gides, and shears. Fig. V is a special section showing the method of giving motion to the inking-frame or revolving arms and to the shaft passing through its center, as hereinafter described. Fig. VI is also a special section, and shows the precise relation of the shaft to the tubular support or shoulder, with the arms or frame to revolve upon the outside of the supporting-tubes, which are firmly fixed to the frame, the same being a horizontal section through the center of the shaft (all the upper parts being removed) so as to expose to view what appears at that part which is included within the red line marked on Fig. V, the same being referred to special marks of reference, the same being different than those on the other figures.

I provide a distributing-surface, which shall always be held in the desired position, upon which to distribute the ink, and in this case show a segment of a cylinder, *a*. Many variations of form may be used, as revolving cylinders placed in fixed position, or flat surface placed in any convenient relation, provided it be so fixed that sets of rollers may pass over one after the other, and allow the impression to be taken after each and every passage of a set of rollers, and the rollers be carried in an onward direction or motion, meeting and inking the form of types in their transit.

In the press as shown the impression-works are within the segment of the cylinder or distributing-surface, properly attached together with the reciprocating type-bed; but other arrangements may be made to bring a set or several sets of rollers in contact with the form of types, the set of inking-rollers having an onward motion and alternately meeting the form of types to ink it, so that an impression may be taken every time one of the sets of rollers pass the form, thus providing a means of slow inking with rapid impressions while the ink is being slowly and evenly distributed by the several sets of rollers passing over the distributing-surfaces—a consummation most desirable in printing at all times.

I do not deem it indispensable that the onward motion should be continuous, as a contrivance might be made by which the motion might be onward and yet alternating or stopping and starting at each impression without any material loss of time to the impression. Within the frame and outside of the distributing surface or segment of a cylinder is the revolving frame or arm *c*, with the rollers *m* in place, to traverse round the distributing-surface and form of types, the rollers *m* being in contact with the distributing-surface. These arms I use, as I consider them the simplest means of carrying the rollers.

A shaft, *h*, is made to revolve at the center of the segment of the cylinder, (see V, in Fig. VI,) receiving its motion in any common way from power. This, which is the main shaft, is cranked in the middle of its length for the purpose of working the impression against the bed, and otherwise the shaft conveys, through ordinary gearing, motion to all parts of the machine. (See wheels and rub-shaft in Fig. V.)

The ink-roller frame or revolving arms are closely fitted at the center of their length to the shoulders or tubular projections, permanently fixed to the permanent frame of the press, one extending from either side of the frame. These will be known as X, Fig. VI, and the revolving roller-frame, which revolves upon the outside of them, as X′, while the permanent frame of the press is V′ in the same figure, the driving-gear being outside this frame, and known as the wheels $a'''$ and $a''''$ in Fig. V. These fixed tubular projections extend toward the center of the press, coming close to the cranked part of the shaft, and thus form supports for the shaft, supports for the bed, and a fixed shaft or journal around which the roller frame or arms revolve, the tubular projections forming the axis for them to revolve upon.

The roller-arms near their outer end are connected by braces, so that the two arms, one on either side of the cylinder, are connected, and thus form a frame to carry the rollers round the segment of the cylinder or distributing-surface, in manner to be presently more fully described.

It should be here understood that the wheel $a'$ upon the main shaft gives motion to wheel $a''$ on the rub-shaft $b'$, and from this it is given to $a'''$, which gears into and conveys it to $a''''$. This wheel $a''''$ is fast with and forms a part of one of the revolving arms—that is, to one side of the roller-frame—and by this means the frame is driven around upon the stationary tubular projections X, giving to the roller-frame an independent motion from that of the shaft $h$, which is the main shaft, with its crank in the middle, and runs at a different speed from that of the roller-frame. Ordinary toothed wheels are employed in giving these motions, of such pitch and number of teeth as may be required to give the proper time of motion to the gearing. The shaft $h$ or main shaft, placed at the center of the segment of the cylinder, gives motion to the several parts of the machine. It passes through from side to side of the press, and is so constructed within said segment as to give motion by means of a crank to the impression-works, including the type-bed, for the purpose of giving the impression.

*Impression apparatus.*—The bed is supported by the stationary tubular projections or shoulders X in Fig. VI, one on either side of the press, forming a part of the main frame, an inner frame being also firmly fixed to the ends of the two projecting tubes or shoulders, which holds the impression-works and bed, so that they may operate, as will be presently described. The interior frame also supports the distributing-surface. The bed is so arranged as to have its face on edge, or in a vertical position, in the machine as presented, but may be placed in horizontal position. The impression is given by the bed advancing to meet the face of type upon it to and against the sheet upon or against the tympan and platen, and for this purpose is provided with extended slides on its sides, as seen in dotted lines at $e$, Fig. I. The type will be as shown. A crank, $g$, is made in the shaft $h$, near or at the center of the width of cylinder. A half toggle-piece, fast in the joint $c'$, is held in suspense when the bed is back or off impression, and comes forward when the crank in its revolution comes in contact with the end of the half-toggle $i$, and, pressing the toggle down in to a line with the center of the crank, pushes the bed to the impression. When the impression is on, the crank will be in a position as seen at $g$, its center or shaft being $h$. (See Fig. I.) The bed is then drawn forward for impression each revolution of the crank. It also reverses or draws the bed into the cylinder to the place of inking the form, at which time the bed is virtually a continuous part of the periphery of the cylinder—that is, the face of the type is such. The toggle and crank being a common and well-known device for giving impression in printing-presses, and its use being nothing new in this machine, it will be clearly understood by the merely showing its positions at rest by any person familiar with building such machinery, as any other toggle would do as well as the one shown.

I do not confine myself to any particular sizes or extent of motions, as the discretion of builders will always dictate these in accordance with the size of press he desires to build.

*Inking apparatus.*—For the purpose of giving a slow distribution of the ink and a slow inking of the type or form, and at the same time admit of rapidly-repeated impressions, I use several sets of rollers—two or more sets, as may be desired—which several sets shall admit of an impression being taken after the passage of each set of rollers consecutively over the form of types. It will at once be seen that the rollers must thus necessarily move very slowly relatively to the number of impressions to be given.

I do not confine myself to the precise method of carrying the sets of inking rollers in their transit around and over a distributing-surface, as there are many devices and well-known mechanical contrivances which may be used to accomplish the same effect; nor yet do I confine myself to any particular form or shape of the distributing-surface, there being many mechanical deductions, one of which may be fully equivalent to the other, and yet allow of the sets of rollers passing around or over the distributing-surface. Therefore the form or shape or shapes, if there be more than one part or surface, is not essential to the result, nor yet to the nature of the invention.

The exterior of the segment of the stationary cylinder $a$ is the surface for distributing the ink properly by the inking-rollers turning upon its periphery-surface, and being there distributed by these rollers. One of the rollers in each set has a vibrating motion while upon the cylinder, but only an onward motion while passing over the form. This motion is produced when the rollers pass around the cylinder by an arm from a stationary cam, in the ordinary way, therefore needs no particular description.

The ink is supplied from a fountain of ordinary construction to the surface of the cylinder $a$. The revolving arms or frame $c$ will be seen in section, Fig. II, the rollers $m$ being in place, and their pressure-springs $n$ shown upon the outside of the arms. One of these arms is placed opposite the other, on each side of the press, and each arm is confined to the other by connecting-rods, so that the two form a frame to revolve and carry the rollers. A set of rollers being placed at each end of the arms—that is, two or more sets of rollers may be made to be used in combination with a set of revolving arms or a revolving frame, or some equivalent device, the speed of its revolution being so governed as to bring one set slowly over the form before the impression, and a succeeding set before the next impression, and so on continuously. Thus, motion being given to the revolving arms from the gearing, each set of rollers is brought in contact with the form as it passes round the cylinder; the motion of the arms being slow in proportion to the number of sets used, as compared with the number of impressions, and their rapidity as governed by the gearing.

*Sheet apparatus.*—A long or continuous sheet of paper, *o*, is placed upon a drum, *p*, at the upper part of the frame. The end of this sheet of paper then passes through a gage, *l*, to press it tight and prevent its feeding in too fast, and between guides *q*, Fig. IV, to keep it in a direct line, down along the face of the platen to the shears for cutting it off. It is fed down to the place of cutting by a pawl, *r*, which gets its motion from a crank, *s'*, on the shaft *t*, connected with the gearing by a second crank, *d'*, and the connecting-rod *e'*, to the eccentric-pin *f'* on the toothed wheel *d''*. The shears are placed and act horizontally. They act as common shears, and get their motion from a cam, *y*, on a rub-shaft, provided as the axis of said cam. This cam is shown in its position by dotted lines, (see Fig. I,) which, as it travels, moves its opposite end (of a crank-like shape) *u*, causing it to vibrate to and fro, and, by the connecting-rod *z*, draw the shears open and push them shut. The shears cut when they are shut, and the two parts of them are known, the stationary as *x* and the connecting as *w*. (See Fig. III.) An edge view of the cam *y* is shown in Fig. III; also, the connecting-rod *z*, and this is a top view of the shears. The frame is arranged to receive and accommodate the several parts of the machine for the operations described.

Operation: Motion being given to the center or main shaft by any power or means, the whole will move in its proper order as governed by the gearing—that is, as soon as one set of rollers has passed the form of types an impression is given. Meantime, the moment the impression is off, the sheet moves on to the length gaged, being carried by the pawl *r*. (Two of these pawls may be used, if preferred, one on each side of the sheet.) The shears then move forward and cut it off, and it falls below to a box for its reception. These operations are repeated and continued as long as motion is given and the sheet supplied.

Such is the competition in printing-presses that everything which increases speed and diminishes labor, without loss in quality of workmanship, is considered important. All these I claim to have accomplished in this press. By the use of the continuous sheet of paper I am enabled to overcome the difficulty in feeding separate sheets to each impression, and can feed rapidly as rotary motion can cause the sheet to be drawn in. By placing the impression apparatus within the cylinder I economize in the room which the press occupies, and render it very simple and not liable to get out of repair. The bed thus arranged is not liable to the heavy concussions in reversing motion so great an evil in the revolving-cylinder press—known as the Napier press. The extent of surface over the stationary cylinder's periphery insures an equal distribution of the ink before it reaches the form, while the slow motion of the rollers around it prevents their heating from friction. No objection exists to rapid impression when the form is properly inked. Therefore the absence of reversion and concussion enables much less power to drive the machine more rapidly than the old cylinder-press, while the arrangements of parts are not repugnant to the most rapid production of printed sheets.

It will also be seen that sheets of paper are here allowed to drop into place in the same manner as now in use in the paper-mills, thus saving all necessity of a flying apparatus, as in other presses where the single sheet to the impression is used. For register it surpasses others, as the sheet is drawn in evenly and equally, thus dispensing with all necessity for pointing the sheets, as required for such purpose in other presses. As a press for cards it is equally applicable, as these are as easy if not more easy to feed in a continuous sheet than paper. With one of these presses from six to ten thousand impressions have been made per hour, while other registering-presses have only been able to reach two thousand impressions per hour.

Having thus fully described and explained my improvements, I wish it to be distinctly understood that I do not claim the periphery of a cylinder as a necessary form for a distributing-surface for the ink, nor the segment of a cylinder to form a place for the impression-works, bed, and form of types, so arranged as to be held by catches or stops in a proper position to receive the impression or to be turned over any required distance to receive the form, as in the Voorhees' press; but

What I do claim is—

1. The arrangement of a distributing-cylinder, or segment of a cylinder, or other suitable form of distributing-surface, which shall always be held or fixed in the desired position without resort to stops latches, or other secondary and movable attachments, and at the same time allow the rollers or sets of rollers to move unimpeded in an onward direction around or over it, for the purpose of distributing the ink evenly and meeting and inking the form of types in their transit, one set after the other at each succeeding passing over the distributing-surface and form of types, performing its proper duties, the whole being one continuous operation.

2. Carrying two or more sets of rollers in an onward direction around and over a distributing surface or surfaces and a type-bed when such sets of rollers shall admit an impression to be taken immediately after the passage of each set of rollers consecutively, whether the rollers are carried in the precise manner herein set forth, or by some equivalent mechanical contrivance to produce a like result—that is to say, the allowing of several sets of rollers, alternately or consecutively, to pass over or around the distributing-surface and the form of types, and admit an impression to be taken between the time one of the sets of rollers leaves the form and the next set arrives at it, for the purpose of giving a slow motion to the inking with rapid impressions upon the same form of types, thus effecting more speed as regard the number of impressions in a given time, as herein set forth.

3. The arrangement as a fixture to the frame and forming a part thereof, one on each side of the press, extending inward toward its longitudinal center, of tubular projections, or studs, or sleeves, or shoulders, or their equivalents, for the purpose of supporting both the bed and inking apparatus, or either of them, upon such tubes or projections, while at the same time the frame or roller-carriage may be snugly fitted to the outside of such tubes so as to have its bearing and revolve upon it, and the projecting tubes form the journal-boxes in which the main shaft rests and resolves, each of these by different gearing and at different speeds, if needs be, so that by the use of such projecting studs may be effected change of speed between the inking-rollers and the impression-shaft, all working upon and from one general center; also, the separate revolving of the roller upon the outside of the same regardless of where the main shaft may be placed, studs forming supports for the inking and impression apparatus.

4. I do not claim the continuous sheet, nor feeding a continuous sheet of paper to a printing-press; but I do claim the arrangements of the gage 1, guides 2, pawl $h$, cranks $s$ and $d'$, rod $e'$, pin $b$, and wheels $a''$, in combination with the shears for cutting off the sheet after it is printed, and the cam $y$ from which it receives its motion, the whole of these parts operating as described, all of which is herein fully described and set forth.

GEO. P. GORDON.

Witnesses:
J. L. KINGSLEY,
P. SIDNEY DOANE.